United States Patent [19]

Volk, Jr.

[11] 4,102,055
[45] Jul. 25, 1978

[54] SENSITIVE INCLINOMETER

[75] Inventor: Joseph A. Volk, Jr., Florissant, Mo.

[73] Assignee: Borg-Warner Corporation, Chicago, Ill.

[21] Appl. No.: 782,130

[22] Filed: Mar. 28, 1977

[51] Int. Cl.² ............................................. G01C 9/12
[52] U.S. Cl. ......................................... 33/345; 33/391
[58] Field of Search ................. 33/365, 391, 397, 345

[56] References Cited

U.S. PATENT DOCUMENTS

| 2,572,766 | 10/1951 | Rylsky | 33/345 |
|---|---|---|---|
| 2,598,552 | 5/1952 | Jansen | 33/365 X |
| 3,520,065 | 7/1970 | Pace | 33/391 |
| 3,731,938 | 5/1973 | Wren | 274/23 R |

Primary Examiner—Charles E. Phillips
Attorney, Agent, or Firm—James E. Tracy

[57] ABSTRACT

The angular deflection or tilt angle from vertical is determined by an inclinometer wherein a weight is offset and hung from a rotatable shaft to which a needle pointer is affixed. When the inclinometer is oriented such that the shaft is vertically aligned, the gravitational force on the weight is in a direction parallel to the shaft's axis and no torque results. When so oriented, a magnetic spring system holds the shaft in a reference position and the needle points to the center of a graduated scale, thereby indicating a zero tilt angle. If the inclinometer, and consequently the shaft, are tilted in a tilt plane, defined by the shaft and the center of the scale, the weight exerts a torque on the shaft and causes pivoting of the needle away from the center of the scale to indicate the direction of tilt and the magnitude of the tilt angle.

1 Claim, 4 Drawing Figures

SENSITIVE INCLINOMETER

BACKGROUND OF THE INVENTION

This invention relates to a sensitive inclinometer which accurately measures very small angles relative to vertical. Such a device may be used in widely diverse fields and with any structure whose angular position must be precisely determined. One such application is in the field of hospital beds where it is desirable to tilt such a bed to different tilt angles and in both of the tilt directions, namely head-up and foot-down or vice-versa. For example, when a patient occupying a bed goes into shock, the bed should immediately be tilted to a trendelenburg position which has a specific tilt angle with the patient's head below his legs. The inclinometer of the present invention is especially useful when incorporated in a hospital bed to measure its tilt angle and tilt direction.

Previously developed inclinometers, capable of accurately measuring small deflection angles, are of complex and expensive construction. The present inclinometer, on the other hand, achieves very precise angle measurements and yet exhibits a unique construction which is relatively inexpensive and yet extremely reliable and rugged.

SUMMARY OF THE INVENTION

The sensitive inclinometer of the invention indicates the angular deflection or the tilt angle from vertical. It comprises a shaft and means, including a bracket assembly, for rotatably mounting the two ends of that shaft. A needle, having one end secured to the shaft, rotates therewith in a direction and to an extent determined by the direction and amount of rotation of the shaft from a reference position. There is a graduated scale on the bracket assembly having degree indicia thereon, the free end of the needle pointing to the center of the scale when the shaft is in its reference position. Means, such as a magnetic spring system, are provided for positioning the needle to its reference position when the shaft is vertically aligned, the indicia at the center of the scale indicating that a zero deflection or tilt angle exists between the shaft's axis and vertical. The inclinometer also includes a weight secured to, but offset from, the shaft, the gravitational force on the weight being in a direction parallel to the shaft's axis when the shaft is vertically aligned, thereby exerting no torque on the shaft. However, the weight produces a clockwise torque on the shaft when it is tilted in one direction away from vertical and in the tilt plane defined by the shaft and the center of the scale, thereby causing pivoting of the needle to a point on one side of the center of the scale to indicate the tilt direction and also the tilt angle between the shaft's axis and vertical. Conversely, the weight exerts a counterclockwise torque on the shaft when it is tilted in the tilt plane in the other direction away from vertical, thereby effecting pivoting of the needle to a point on the other side of the center of the scale to indicate the tilt direction and angle.

DESCRIPTION OF THE DRAWINGS

The features of the invention which are believed to be novel are set forth with particularity in the appended claims. The invention, together with further advantages and features thereof, may best be understood, however, by reference to the following description in conjunction with the accompanying drawings in which:

DESCRIPTION OF THE ILLUSTRATED EMBODIMENT

Figure 1:
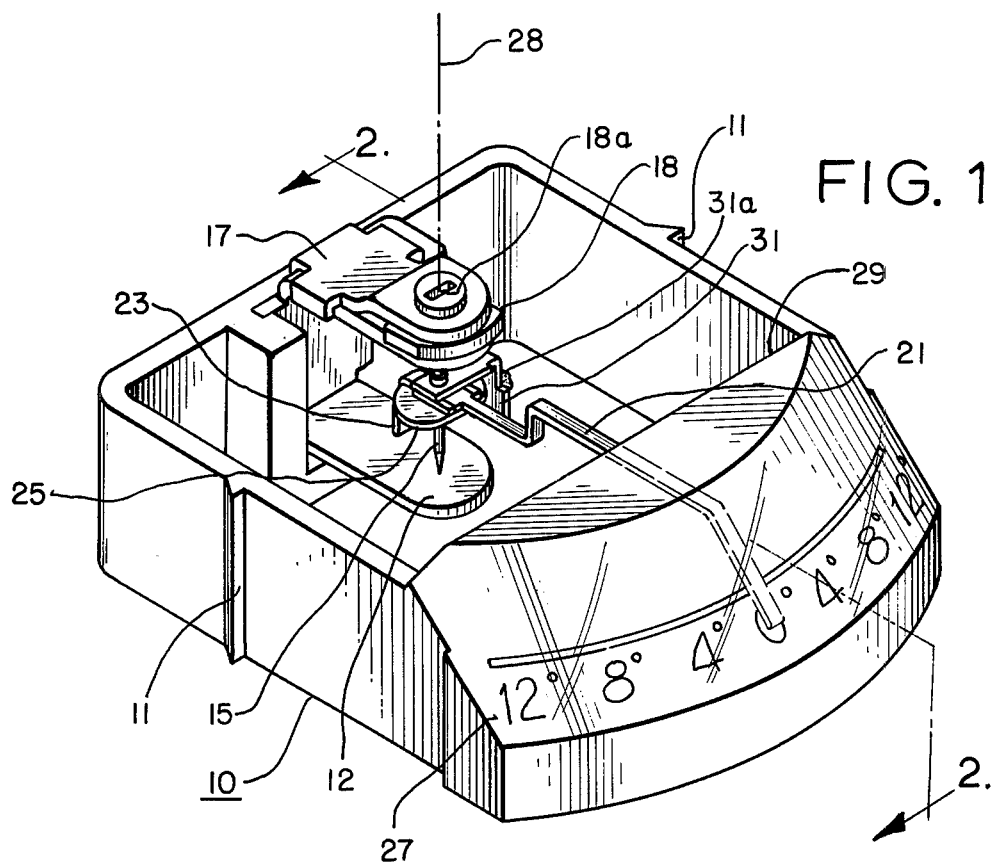
FIG. 1 is a perspective view of a sensitive inclinometer constructed in accordance with one embodiment of the invention and illustrating the positions of the various movable parts when the inclinometer measures a zero tilt angle.
Figure 2:
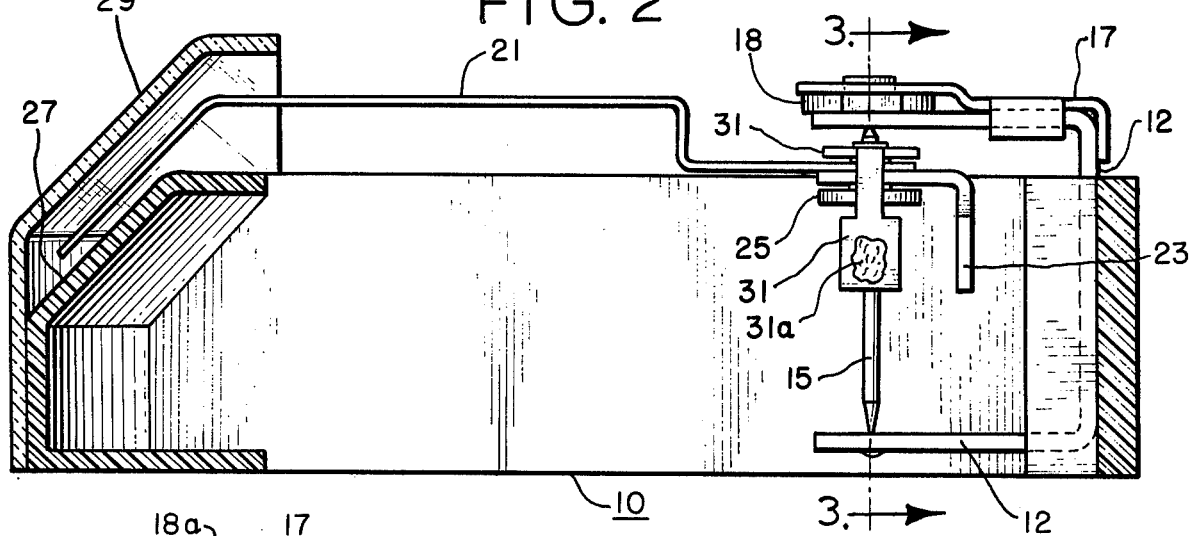
FIG. 2 is a sectional view taken along the plane of section line 2—2 in FIG. 1.
Figure 3:
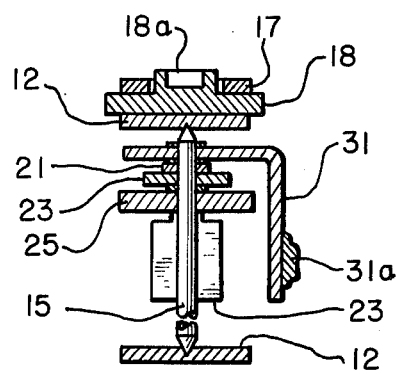
FIG. 3 is a partial sectional view taken along the plane of section line 3—3 in FIG. 2.

The disclosed sensitive inclinometer is mounted in any convenient manner on an apparatus whose tilt angle and direction are to be determined. Superfluous parts such as mounting structure and an enclosure housing have been purposely omitted to avoid encumbering the drawings and to provide a clearer illustration of the invention. The inclinometer must be attached to the tiltable apparatus so that it is horizontally oriented (as shown in FIG. 2) when the apparatus is in its zero tilt position. For example, when used to measure the angular position of a hospital bed, the inclinometer of the invention may be supported on and recessed in the bed's footboard. When the bed is tilted to a head-low position, the top of the footboard tilts toward the head of the bed, while in the head-high position the top of the footboard tilts away from the head.

Turning now to the specific construction of the illustrated embodiment, bracket assembly 10 (most of which is preferably made of plastic) provides the basic framework for the inclinometer and supports all of its other parts. Ridges 11 are provided to facilitate mounting of the bracket assembly. U-shaped metal bracket 12 is affixed (such as by cementing) to the back wall of assembly 10. The two ends of shaft or axle 15 are rotatably mounted in a pair of bearings (which may constitute merely indentations) in U-shaped bracket 12. Metallic element 17 folds over and attaches to the top of bracket 12 in order to captivate and hold magnet 18 in an adjustable fixed position.

One end of needle or pointer 21 is secured to shaft 15 in any convenient manner, the needle thereby pivoting anytime the shaft rotates. A weight, in the form of metallic tab 23, is fixed to and rotates with shaft 15 and is in alignment with needle 21 in order to counterbalance the weight of the needle. Magnet 25 is secured to shaft 15 so that it pivots anytime the shaft rotates. Fixed magnet 18 and rotatable magnet 25 constitute a magnetic spring system which tends to hold shaft 15 in a reference position. More particularly, magnet 25 tends to rotate so that its North Pole and South Pole align with the South and North Poles, respectively, of magnet 18. When these magnets are aligned (as shown in FIGS. 1 - 4), shaft 15 is in its reference position and needle 21 points to the center of the generally horizontal, graduated scale 27. The scale and needle are covered by a protective transparent plastic shield 29. Shaft 15 will be in its reference position when the structure, on which bracket assembly 10 is supported, is oriented so that the shaft becomes vertically aligned, vertical being indicated in the drawings by dashed construction line 28. Accordingly, this is the position which indicates a zero deflection or tilt angle between the axis of shaft 15 and vertical, and scale 27 is so marked at its center. Slot 18a permits screwdriver adjustment of fixed magnet 18 to facilitate accurate zero setting of the inclinometer so that needle 21 will point to dead center of scale 27 when shaft 15 is vertically oriented. Of course, a mechanical coil spring system could be employed instead of the illustrated magnetic spring system.

The disclosed inclinometer is constructed to measure the tilt angle and indicate the tilt direction anytime the structure, to which the inclinometer is attached, tilts shaft 15 in the plane defined by the shaft and the center of scale 27. This tilt plane is indicated by arrows 29 in FIGS. 4 and 5. In other words, the indicating plane (that defined by needle 21 and scale 27) will be perpendicular to the measured or tilt plane. This is achieved by hanging and securing a weight 31 on, but offset from, shaft 15 so that any pivoting of the weight causes rotation of the shaft. Weight 31 preferably takes the form of a metal tab that extends out from needle 21 at a right angle. Reference number 31a denotes a glob of solder which is added during manufacture to bring the weight up to the precise level required for the inclinometer to function accurately.

When shaft 15 is vertically aligned (as in FIGS. 1 – 4) and the inclinometer indicates a zero tilt angle, the gravitational force on weight 31 is in a direction parallel to the axis of shaft 15. Hence, there will be no torque or moment about the shaft's axis and weight 31 will not disturb the zero deflection indication. Assume now that the apparatus, monitored by the inclinometer, tilts 4°, for example, in the tilt plane and in the direction wherein the top end of shaft 15 moves to the right of the lower end, as viewed in FIGS. 2 and 4. Such a tilted position is shown in FIG. 5. The gravitational force on weight 31 is now in a direction no longer parallel to the shaft's axis, with the result that a counterclockwise torque (as viewed from the top of shaft 15) is produced which turns the shaft to the extent necessary to point the needle to the 4° indication on the side of the scale to the right of center, as illustrated in FIG. 5. Of course, weight 31 must overcome the bias spring effect of the magnetic spring system. When shaft 15 is rotated away from its reference or zero deflection position, the magnetic spring system produces a counter torque on the shaft equal and in opposition to the torque produced by weight 31. In this way, needle 21 will be held steady at the 4° marking on the scale. The counter or restoring torque, provided by magnets 18 and 25, is directly proportional to the angular rotation of shaft 15 away from its reference position. In the absence of a spring return system of some type, the slightest tilting of the shaft from vertical causes needle 21 to immediately swing to a limit position, 12° in the illustrated embodiment.

Figure 4:
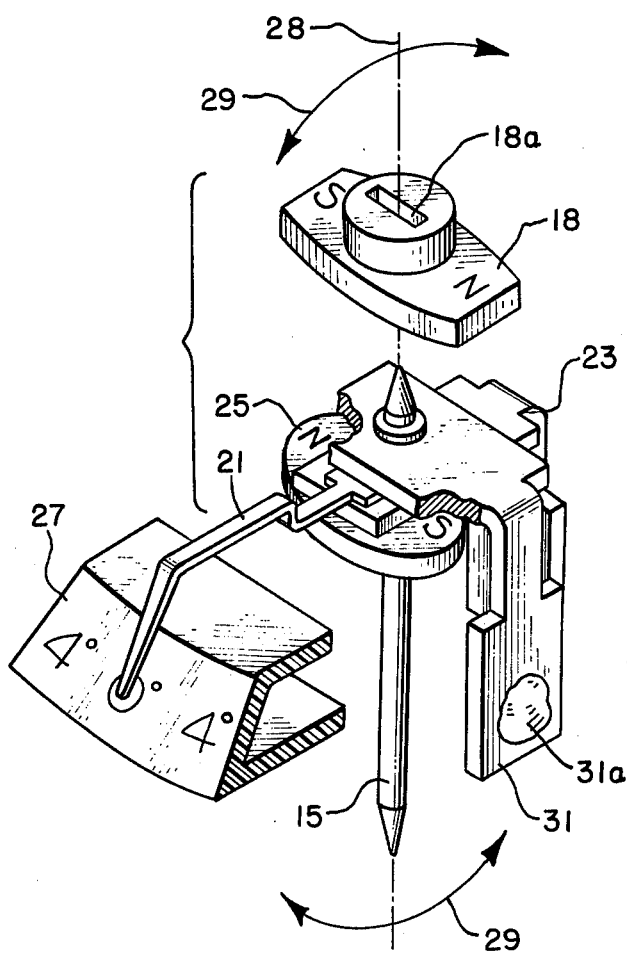
FIG. 4 is a perspective, partially exploded and partially broken away view of a portion of the inclinometer showing the inclinometer in the zero tilt position; and, FIG. 5 is a view similar to FIG. 4 except that the inclinometer is illustrated in a tilt position.
Figure 5:
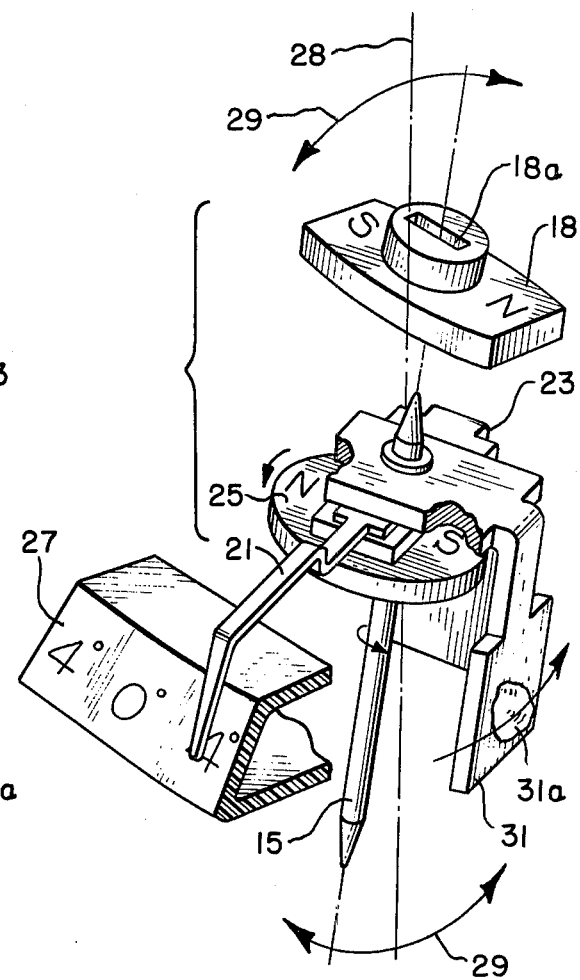

It should now be apparent that tilting of shaft 15 away from vertical in the other direction (namely the top end pivoting to the left of the lower end as viewed in FIGS. 2 and 4) and in the tilt plane produces a clockwise torque on shaft 15 such that needle 21 is deflected to the left of center on scale 27 to a degree indicia indicating the exact tilt angle.

While a particular embodiment of the invention has been shown and described, modifications may be made, and it is intended in the appended claims to cover all such modifications as may fall within the true spirit and scope of the invention.

I claim:

1. A sensitive inclinometer for indicating angular deflection from vertical comprising:

a bracket assembly a shaft;

means, including a bracket mounted in said bracket assembly and having bearing means, for rotatably mounting the two ends of said shaft;

a needle extending generally perpendicular to said shaft, having a free end and one end secured to said shaft and rotatable therewith in a direction and to an extent determined by the direction and amount of rotation of said shaft from a reference position;

a generally horizontal graduated scale, on said bracket assembly, having degree indicia thereon, the free end of said needle pointing to the center of said scale when said shaft is in its reference position;

a magnetic spring system, including a magnet secured to said shaft rotatable therewith and a fixed magnet secured to said bracket assembly, for positioning said needle to its reference position when said shaft is vertically aligned, while the indicia at the center of said scale indicating that a zero deflection or tilt angle exists between the shaft's axis and vertical;

a first weight, including a first metal tab offset from and extending at a right angle to said needle, secured to and offset from said shaft, the gravitational force on said first weight being in a direction parallel to the shaft's axis when said shaft is vertically aligned, thereby exerting no torque on said shaft, said first weight producing a clockwise torque on said shaft when said shaft is titlted in one direction away from vertical and in the tilt plane defined by said shaft and the center of said scale, thereby causing pivoting of said needle to a point on one side of the center of said scale to indicate the tilt direction and also the tilt angle between the shaft's axis and vertical, said first weight exerting a counterclockwise torque on said shaft when said shaft is tilted in the tilt plane in the other direction away from vertical, thereby effecting pivoting of said needle to a point on the other side of the center of said scale to indicate the tilt direction and angle, said magnetic spring system producing, when said shaft is tilted, a countertorque on said shaft equal and in opposition to the torque produced by said first weight in order to hold said needle steady on said scale;

and a second weight, including a second metal tab fixed to and offset from said shaft on the side opposite said needle and extending in alignment with said needle, for counterbalancing the weight of said needle so that said needle produces no torque on said shaft regardless of the tilt angle.

* * * * *